United States Patent [19]

Hayes

[11] Patent Number: 5,224,339
[45] Date of Patent: Jul. 6, 1993

[54] COUNTERFLOW SINGLE ROTOR TURBOJET AND METHOD

[75] Inventor: Jeffrey M. Hayes, Phoenix, Ariz.

[73] Assignee: Allied-Signal Inc., Morris Township, Morris County, N.J.

[21] Appl. No.: 629,865

[22] Filed: Dec. 19, 1990

[51] Int. Cl.⁵ ............................ F02C 3/045
[52] U.S. Cl. .................... 60/39.43; 60/745; 60/269
[58] Field of Search ........... 60/39.43, 745, 269, 60/39.75, 39.36; 415/79

[56] References Cited

U.S. PATENT DOCUMENTS

| | | | |
|---|---|---|---|
| 2,543,864 | 3/1951 | Melenric | 60/269 |
| 2,751,445 | 10/1955 | Giliberty | |
| 3,238,720 | 3/1966 | Larisch | 60/745 |
| 3,269,120 | 8/1966 | Sabatiux | |
| 3,688,496 | 9/1972 | Sorensen | |
| 3,756,019 | 9/1973 | Holzapfel et al. | |
| 3,783,618 | 1/1974 | Kawamura | |
| 4,506,502 | 3/1985 | Shapiro | |

*Primary Examiner*—Louis J. Casaregola
*Attorney, Agent, or Firm*—Jerry J. Holden; James W. McFarland; Robert A. Walsh

[57] ABSTRACT

A small gas turbine engine for generating thrust and shaft horsepower is provided. The engine is comprised in a flow series arrangement of an inlet, a diffuser, a single stage compressor, a fuel slinger combustor, a single stage turbine, and an exhaust nozzle. The compressor circumscribes the turbine and is mounted on the same rotating wheel so that the flow of air in the compressor is in the direction opposite to the direction of hot gas flow in the turbine. Accordingly, both the compressor and turbine are on the same side of the combustor and hence only a single bearing support structure is required.

7 Claims, 1 Drawing Sheet

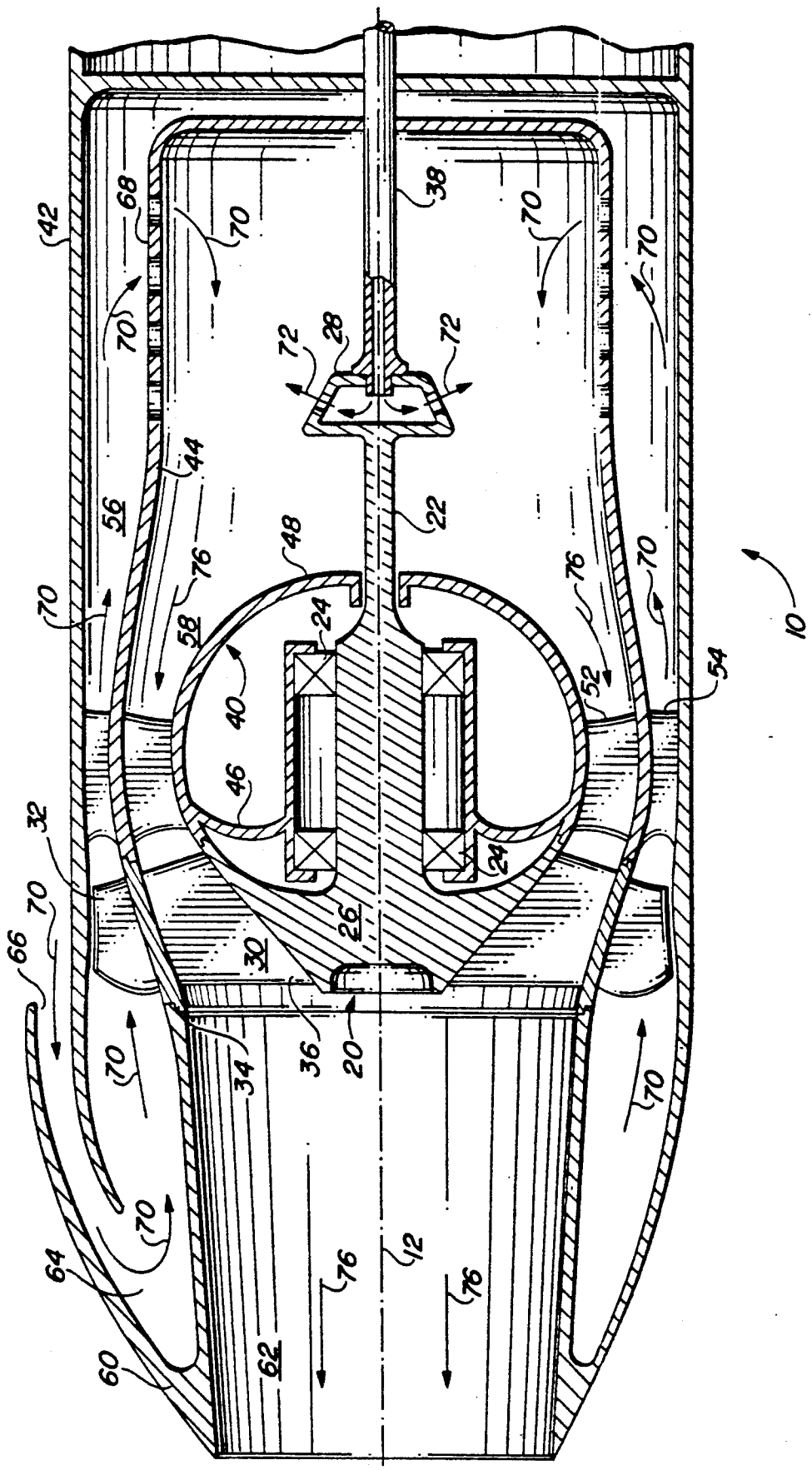

COUNTERFLOW SINGLE ROTOR TURBOJET AND METHOD

TECHNICAL FIELD

This invention generally relates to small gas turbine engines, and more specifically to a small gas turbine engine in which the compressor stage circumscribes the turbine stage and is mounted on the same wheel therewith, so that the air in the compressor flows in a direction opposite to the direction of gas flow in the turbine.

BACKGROUND OF THE INVENTION

Small gas turbine engines have been built in numerous configurations. For example, some engines have a centrifugal compressor in a back-to-back arrangement with a radial turbine. These engines are poor candidates for applications having strict size limitations, because they generally have large diameters relative to their inlet air flow and hence, generate low thrust per unit of frontal area. Other small gas turbine engines consist of an axial compressor in axial arrangement with an axial turbine. These engines tend to have multistage compressors and turbines making them longer and mechanically more complicated than the centrifugal engines.

Holzapfel et al., U.S. Pat. No. 3,756,019 describes yet another gas turbine configuration in which a multistage turbine circumscribes a multistage compressor. The compressor and turbine are divided into two sections with each section having its own shaft. One disadvantage with the Holzapfel configuration is that the turbine blades have higher wheel speeds, (i.e. higher radius), than the compressor blades. Typically, the compressor in a gas turbine engine needs higher wheel speeds or more stages than its driving turbine in order to absorb the turbine's work. Thus, an engine configuration in which the turbine has higher wheel speeds than the compressor will require more compressor stages making the overall engine larger and perhaps requiring a multiplicity of shafts. Also, the Holzapfel configuration places the hotter turbine flowpath outside the cooler compressor flowpath. As a result, the engine's mount, and the surrounding airframe structure, referred to as the nacelle, must be made strong enough to withstand these hot temperatures, resulting in heavier components.

Accordingly, a need exists for a small, light weight gas turbine engines that overcomes the disadvantages found in the prior art, small gas turbine engines.

SUMMARY OF THE INVENTION

An object of the present invention is to provide a small, lightweight, inexpensive gas turbine engine capable of generating both thrust and shaft horsepower.

Another object of the present invention is to provide a small gas turbine engine having a cool outer casing.

Yet another object of the present invention is to provide a gas turbine engine comprised of a single rotor having a single stage compressor and a single stage turbine mounted thereon, and supported only by a single bearing support structure.

Yet still another object of the present invention is to provide a gas turbine engine having a single array of radially extending blades comprised of a radially outer portion, that has an aerodynamic shape for imparting energy to a flow stream, and a radially inner portion that has an aerodynamic shape for extracting energy from a flow stream.

The present invention achieves the above-stated objectives by providing a small, gas turbine engine in which a single stage compressor circumscribes a single stage turbine.

These and other objects, features and advantages of the present invention are specifically set forth in or will become apparent from the following detailed description of a preferred embodiment of the invention when read in conjunction with the accompanying drawing.

BRIEF DESCRIPTION OF THE DRAWINGS

The single FIGURE is a schematic, cross-section of a small gas turbine contemplated by the present invention.

DESCRIPTION OF THE PREFERRED EMBODIMENT

The single figure depicts a gas turbine engine in the form of a counterflow, single rotor turbojet generally denoted by the reference numeral 10. The turbojet engine 10 is comprised of a plurality of rotating components, collectively referred to as a rotor assembly 20, coaxially disposed about the centerline 12 of the engine 10, and a plurality of stationary components, collectively referred to as a stator assembly 40, circumscribing the rotor assembly 20.

The rotor assembly 20 includes a rotatable shaft 22 journaled by bearings 24. The shaft 22 has at a first end a wheel 26 and at a second end a slinger type fuel nozzle 28. A plurality of rotating blades 30 are circumferentially mounted about the wheel 26 and extend radially therefrom. Each of the blades 30 has a radially outer portion 32 attached to a radially inner portion 36 by an annular platform member 34. The inner portion 36 has an aerodynamic shape for extracting pressure energy from a flow stream of pressurized hot gas and converting this energy into rotary motion of the outer portion 32, the wheel 26 and the shaft 22. The outer portion 32 has an aerodynamic shape for converting the rotary motion from the inner portion 36 into pressure energy in a flow stream of ambient air. Preferably, the aerodynamic shapes of both the inner and outer portions 36,32 are of a mixed-flow type. A hollow drive shaft 38 extends coaxially from the fuel nozzle 28 to a gearbox, (not shown). Fuel for the engine 10 is brought to the fuel nozzle 28 through the drive shaft 38. Alternately, if there is no need for a gearbox then the shaft 38 can fixedly mounted within the engine 10.

The stator assembly 40 includes an outer cylindrical casing 42, an inner cylindrical casing 44, and an annular bearing support member 46 having a rounded leading edge 48 mounted on the bearings 26. A plurality of stator nozzles 52 are circumferentially mounted about the support member 46 and support the inner casing 44. Similarly, a plurality of stator vanes 54 are circumferentially mounted about the outer circumference of the inner casing 44, and supports the outer casing 42. The outer and inner casings 42,44 define a first annular, diverging flowpath 56 therebetween, and the inner casing 44 and the support member 46 in combination with the shaft 26 define a second annular flowpath 58 therebetween. A portion 60 of the outer casing 42 extends beyond the rotor assembly 20 and defines an exhaust nozzle 62. Also, part of the portion 60 folds back upon itself defining a diffuser 64 having a 180 degree turn, that extends from an inlet 66 to the outer portions 32 of the blades 30. The inlet 66 extends circumferentially only partway about the engine 10.

In operation, air represented by the arrows 70 enters from the surrounding environment through the inlet 66 and undergoes a 180 degree in the diffuser 64 before reaching the outer portions 32 of the blades 30. The air is compressed by the outer portions 32 which also impart a swirl to the air. This swirl is diffused and straightened by the stator vanes 54. The air exiting the stator vanes 54 is further diffused in the diverging, annular flow path 56 and then undergoes another 180 degree turn as it is drawn through orifices 68 disposed within the inner casing 44. The orifices 68 place the first flow path 56 in fluid communication with the second flow path 58. After passing through the orifices 68, the air is mixed with fuel represented by arrows 72 and ignited by an igniter not shown. The hot, pressurized gas represented by arrows 76 then passes through the stator nozzles 52 which aligns the flow prior to entering the inner portion 36 of the blades 30 where pressure energy is extracted from the hot gas and converted into rotary motion. After exiting the blades 30 the gas is further expanded in the exhaust nozzle 62 and thrust is generated.

A method for generating thrust and shaft horsepower within a small volume is also provided. In this method, a stator assembly circumscribes a rotor assembly so that a coaxially mounted shaft is circumscribed by a first flow path which in turn is circumscribed by a second flow path, which in turn is circumscribed by an inlet. Air is ingested through the inlet, turned 180 degrees inward and then compressed in a single stage compressor. After exiting the compressor the air undergoes a second 180 degree inward turn and is then mixed with fuel and ignited. The resulting hot gas is expanded across a turbine to a pressure above ambient, thereby generating shaft horsepower. After exiting the turbine the gas is further expanded to ambient pressure, thereby generating thrust.

Thus, a small, lightweight, inexpensive gas turbine engine having numerous advantages over the prior art is provided. In particular, in this small gas turbine engine the compressor is subjected to higher wheel speeds than the turbine. Accordingly, only a single compressor stage is required to absorb the work output of the single stage turbine. Further, because there is only one compressor stage only one shaft is needed resulting in an overall simpler, and hence less expensive engine. Another advantage of the present invention is that the cooler compressor flow path circumscribes the hotter turbine flow path, thus reducing the temperatures that the nacelle and engine mounts are exposed to. Also, by placing the compressor and turbine on the same axial side of the engine only a single bearing support is required making the engine mechanically simpler and lighter. The engine's design simplicity is further enhanced by certain of its components performing multiple functions. For example, the stator nozzles 52 and the stator vanes 54 perform both an aerodynamic function as well as a structural function in supporting the casings 44 and 42 respectively. The shaft 38 not only supports the wheel 26 but also forms a part of the fuel slinger as well as operating as a fuel supply duct.

Various modifications and alterations to the above described engine will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A gas turbine engine having a small frontal area comprising:
    a shaft, coupled to a wheel and a slinger type fuel nozzle, journaled for rotation to a single bearing support structure;
    a nonrotating inner, substantially cylindrical casing circumscribing said shaft and defining an inner flowpath therebetween, said inner casing mounted on said bearing support structure;
    a nonrotating outer, substantially cylindrical casing circumscribing said inner casing and defining an outer flow path therebetween, said outer casing mounted on said inner casing, said outer casing having a first portion that folds outward to define an inlet of said engine and having a second portion that folds inward defining an exhaust nozzle of said engine; and
    a plurality of blades circumferentially mounted to said wheel and extending radial therefrom so that a lower portion of each of said blades is disposed in said inner flowpath and a upper portion of each of said blades is disposed in said outer flow path, said inner and outer flowpaths being in fluid communication.

2. The gas turbine engine of claim 1 wherein said lower portion of each of said blades is configured as a turbine blade, and said upper portion of each of said blades is configured as a compressor blade.

3. The gas turbine engine of claim 1 further comprising a first plurality of circumferentially spaced apart struts, radially extending from said bearing support structure to said inner casing and disposed in said inner flowpath.

4. The gas turbine engine of claim 3 further comprising a second plurality of circumferentially spaced apart struts, radially extending from said inner casing to said outer casing, and disposed in said outer flowpath.

5. The gas turbine engine of claim 4 wherein each of said first plurality of struts is configured as a compressor stator vane, and each of said second plurality of struts is configured as a turbine stator nozzle.

6. The gas turbine engine of claim 5 wherein said compressor stator vanes, are substantially radially aligned with said turbine nozzles.

7. The gas turbine engine of claim 1 further comprising a second hollow shaft coupled to said fuel nozzle and extending axially therefrom and through said outer casing.

* * * * *